United States Patent [19]

Suzuki

[11] 4,051,674

[45] Oct. 4, 1977

[54] MULTICYLINDER INTERNAL COMBUSTION ENGINE

[75] Inventor: Motoo Suzuki, Kyoto, Japan

[73] Assignee: Mitsubishi Jidosha Kogyo Kabushiki Kaisha, Japan

[21] Appl. No.: 665,258

[22] Filed: Mar. 9, 1976

[30] Foreign Application Priority Data

Mar. 20, 1975 Japan .............................. 50-34768

[51] Int. Cl.² .......................................... F02B 75/10
[52] U.S. Cl. .................. 60/282; 123/119 D; 123/127
[58] Field of Search ............ 60/274, 282; 123/119 D, 123/127

[56] References Cited

U.S. PATENT DOCUMENTS 3,708,980   1/1973   Truxell .................................. 60/274
3,827,237   8/1974   Linder .................................. 60/274

Primary Examiner—Robert G. Nilson
Attorney, Agent, or Firm—Robert E. Burns; Emmanuel J. Lobato; Bruce L. Adams

[57] ABSTRACT

An engine has separate cylinders to which rich and lean mixtures are respectively supplied. A common carburetor that is set to make a rich air-fuel mixture is used for feeding both rich and lean mixtures. An air-supply passage is connected to an intake manifold that communicates the carburetor with the cylinder to which lean mixture is fed. The air introduced from the air-supply passage is mixed with the rich mixture to produce the desired lean mixture. A valve unit is installed in the air-supply passage, so that the rich mixture is fed to all the cylinders during high-load operation by closing the valve.

14 Claims, 9 Drawing Figures

MULTICYLINDER INTERNAL COMBUSTION ENGINE

DETAILED DESCRIPTION OF THE INVENTION

This invention relates to a multicylinder internal combustion engine, particularly for automobiles, that is designed to achieve effective emission control.

Recently, engine emissions have been presenting a serious air-pollution problem with a sharp increase in the number of automobiles. To control such emissions, various means have been proposed, among which are the secondary air-supply system, catalytic converter, and exhaust gas recirculation system. But they are not without problems in respect of durability, cost, size, controlling capacity, and so on.

The general automobile internal combustion engine is known to have the following three characteristics:

1. The concentration of nitrogen oxides (NOx) in the exhaust gas lowers when both rich and lean mixtures are supplied.
2. Burning a rich mixture somewhat raises the concentrations of carbon monoxide (CO) and hydrocarbons (HC) in the exhaust gas.
3. Combustion of a lean mixture, without misfiring, lowers the CO and HC concentrations, leaving a higher percentage of residual oxygen in the exhaust gas.

Taking advantage of these three features, a multicylinder internal combustion engine has already been proposed in which a plurality of cylinders are divided into those in which rich mixture is burned and those in which lean mixture is burned. The exhaust gas with low NOx and high HC and CO contents, emitted from the rich-mixture burning cylinders, and the exhaust gas with low NOx, HC and CO contents and high residual oxygen content, from the lean-mixture burning cylinders, are mixed in its exhaust system. By this means, HC and CO in the mixed exhaust gas is oxidized by the residual oxygen. As a consequence, the concentrations of NOx, HC and CO in the final exhaust gas to be emitted into the atmosphere are all reduced to lower levels.

Since the so-called "secondary air" needed for reducing HC and CO in the exhaust emission is contained in the exhaust gas from the lean-mixture burning cylinders, this type of internal combustion engine requires little or no secondary oxidizing air that has heretofore been necessarily fed to the thermal reactor or the catalytic converter of conventional engines. This in turn permits dispensing with, or greatly reducing the capacity of, a secondary-air supply device, such as an air pump, and therefore contributes to cost reduction.

However, this type engine has also some defects. Making both rich and lean air-fuel mixtures necessitates provision of two different carburetors or air-fuel mixture preparing means. This, of course, brings about an increase in cost. Further, the output from the lean-mixture burning cylinders is liable to fall short of the design output level, thus giving rise to an output shortage especially during high-load operation.

One of the primary objects of this invention is to provide an engine that is simple in construction and reasonable in cost by installing a single carburetor or other type of air-fuel mixture making apparatus that is designed to produce a rich mixture. This rich mixture is supplied directly to the rich-mixture burning cylinders on one hand, while, on the other, it is mixed with the air, which is introduced through an air passage from the atmosphere into an intake manifold leading to each lean-mixture burning cylinder, to make a lean mixture desired for the latter cylinders. Another object is to effectively prevent lowering of the engine output during high-load operation by supplying the rich mixture also to the lean-mixture burning cylinders, which is attained by closing a valve, when necessary, installed in the aforesaid air-supply passage.

Other objects and advantages of this invention may be readily understood from the following description on some embodiments of the invention that is made with reference to the accompanying drawings, wherein the same or similar parts are represented by like reference numerals. In the drawings, FIG. 1 is a schematic, partial, cross-sectional view showing a first internal combustion engine embodying this invention.

Figure 1:
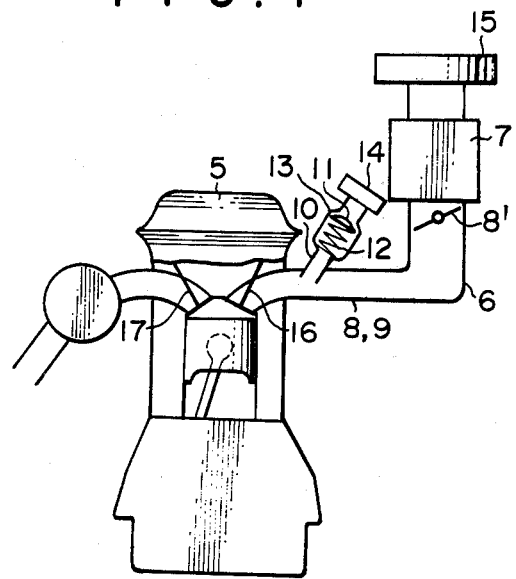
Figure 2:
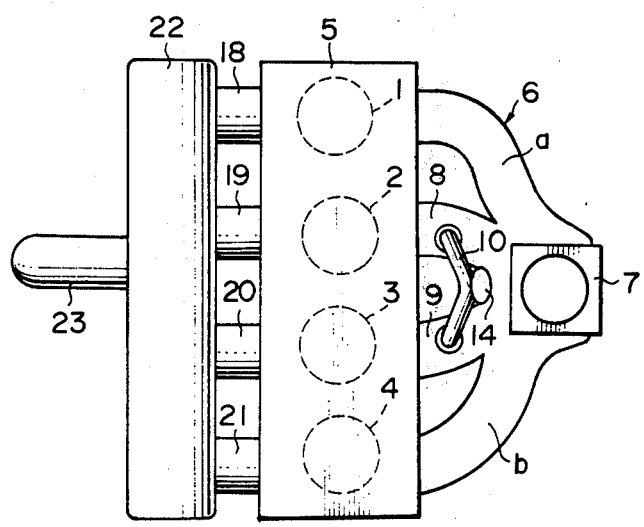
FIG. 2 is a plan view of the same embodiment.

The first embodiment shown in FIGS. 1 and 2 is a four-cylinder internal combustion engine, in which ignition takes place in the order of No. 1 cylinder 1, No. 3 cylinder 3, No. 4 cylinder 4, and No. 2 cylinder 2.

Reference numeral 6 denotes an intake manifold leading to the four cylinders 1 through 4 provided in an engine proper 5. Item 7 is rich-mixture making means that is connected to the upper end of the intake manifold 6; in this embodiment it is a carburetor equipped with a throttle valve 8'.

The intake manifold 6 is divided into first branch passages a and b, which respectively communicate with the cylinders 1 and 4, and second branch passages 8 and 9 respectively leading the the cylinders 2 and 3. Branched ends of an air-supply pipe 10 project into and open in the passages 8 and 9 while the other end of the pipe 10 opens to the atmosphere. At an intermediate position in the air-supply pipe 10 is disposed a check valve 13 comprising a valve disk 11 and a coil spring 12, so that the air is fed through the air-supply pipe 10 into the passages 8 and 9 only when negative pressure working on the passages 8 and 9 exceeds a given value which is determined principally by the biasing force of the spring 12.

Reference numeral 14 designates an air cleaner fitted to the atmosphere side of the air-supply pipe 10. Reference numeral 15 indicates an air cleaner provided on top of the rich-mixture making means 7. Item 16 is an intake valve disposed in each of the cylinders 1 through 4 and item 17 is an exhaust valve. Reference numerals 18, 19, 20 and 21 denote exhaust passages respectively communicating with the cylinders 1 through 4. Item 22 is a thermal reactor communicating with the exhaust passages 18 through 21. And reference numeral 23 denotes an exhaust pipe through which recombusted exhaust gases are discharged into the atmosphere.

In the above-described arrangement, a rich air-fuel mixture made in the rich-mixture making means 7 is sucked into the branched passages of the intake manifold 6. In the passages 8 and 9, the rich mixture is mixed with the air introduced through the air-supply pipe 10 to make a lean mixture. Accordingly, the rich mixture is supplied to the cylinders 1 and 4, while the lean mixture is fed to the cylinders 2 and 3.

In this embodiment, the air-fuel ratio of the rich mixture is set as 12 to 13: 1, and that of the lean mixture as 18 to 20: 1, which are given only as illustrative examples, and, therefore, should not be considered as limiting the scope of this invention.

As described previously, the cylinders of this embodiment combust the mixtures in the firing sequence of No. 1, No. 3, No. 4 and No. 2. Accordingly, combustion takes place alternately in each of the rich-mixture and lean-mixture burning cylinders, as a result of which exhaust gases from the two types of cylinders alternately pass through the respective exhaust passages 18 through 21 into the thermal reactor 22, where they are mixed. There, CO and HC in the exhaust gas from the rich mixture are re-combusted by the residual oxygen in the exhaust gas from the lean mixture. And the resultant exhaust emission containing lower percentages of CO and HC is discharged through the exhaust pipe 23 into the atmosphere.

From the previous description, it is also evident that the internal combustion engine of this invention, having separate cylinders for burning rich and lean air-fuel mixtures, can greatly reduce the production of NOx, compared with the conventional-type engines in which one and the same air-fuel ratio is employed for all cylinders. Under the most ideal conditions, it may be reduced to about one-tenth.

Further, this embodiment is designed so that, when the vacuum in the intake manifold passages 8 and 9 becomes lower than the specified value, the check valve 13 is closed by the force of the spring 12, whereby the supply of air from the air-supply pipe 10 to the passages 8 and 9 is stopped.

Figure 3:
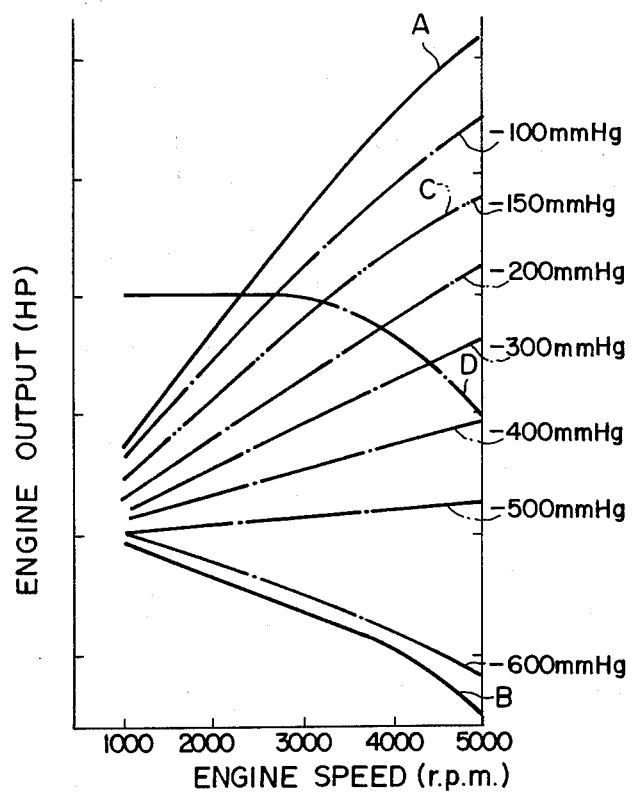
FIG. 3 shows characteristic curves of manifold negative pressure.

FIG. 3 graphically represents the general characteristics of intake manifold vacuum, plotting engine speed (rpm) along the x-axis and power output (hp) along the y-axis.

In this figure, curve A indicates the output that is obtained when the throttle valve is fully opened, curve B shows the output when the throttle valve is fully closed (during idling), and single-dot-dash isobaric curves represent intermediate intake manifold vacuums from −100 mmHg to −600 mmHg, separated by 100 mmHg each.

Let us assume that the check valve 13 is so set as to close when the intake manifold vacuum becomes −150 mmHg. Then, the supply of air through the air-supply pipe 10 is stopped and the rich mixture is fed to all cylinders 1 through 4 in the area above the double-dot-dash isobaric curves indicating intake manifold vacuum of −150 mmHg, i.e., when the engine is operated under high-load conditions. By this means, power output drop under high-load conditions can successfully be prevented.

Further, if the air-fuel ratio of the mixed product of the rich and lean mixtures is so adjusted to become stoichiometric or slightly above, CO and HC can be recombusted in the thermal reactor without providing any new air supplying means in the exhaust system.

In addition, the ignition timing of the rich-mixture and lean-mixture burning cylinders do not need to be synchronized, but they may be differentiated. If the ignition timing of each cylinder is adjusted to such point at which production of NOx is minimized, the greatest emission decontaminating effect will be obtained.

On top of all this, the engine according to this invention is compact in size as well as low in cost, because it can supply mixtures of suitable air-fuel ratios to both the rich-mixture and lean-mixture burning cylinders by use of only rich-mixture making means, without necessitating any special carburetor or other means for making lean mixture.

Figure 4:
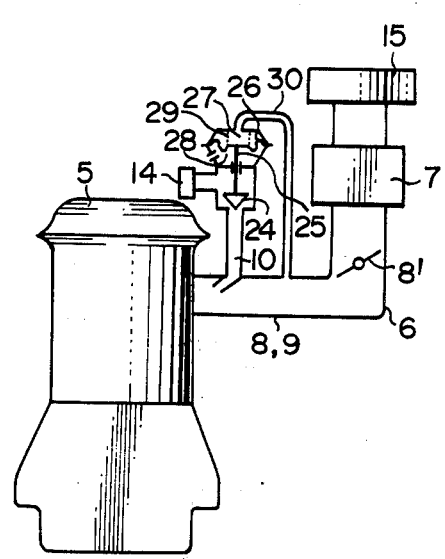
FIG. 4 is a schematic, partial, cross-sectional view of a second internal combustion engine according to this invention.

Now the second embodiment of this invention will be described by reference to FIG. 4. This embodiment provides a modification of the check valve 13 used in the first embodiment. More specifically, there is provided in the air-supply pipe 10 a valve disk 24, adapted to open and close the air-supply pipe 10, and being fixed to the center of a pressure-responsive member comprising a diaphragm 26, through a rod 25, so as to be interlocked with the motion of the diaphragm 26. Of two chambers 27 and 28 separated by the diaphragm 26, one 27 communicates with the intake manifold 6 through a pipe 30, while the other 28 opens to the atmosphere. Item 29 is a coil spring that is fitted in the chamber 27 so as to urge the diaphragm 26 in the direction in which the valve 24 is closed.

In this arrangement, intake manifold vacuum works on the chamber 27 through the pipe 30. When the vacuum exceeds a given value, the diaphragm is sucked upward against the urging force of the spring 29, whereupon the valve disk 24 opens, and air is fed into the passages 8 and 9 through the air-supply pipe 10. Conversely, when the intake manifold vacuum becomes lower than the given value under high load conditions, the valve disk 24 closes to cut the supply of air. By so doing, this embodiment achieves the same effect as the previously described first embodiment.

Figure 5:
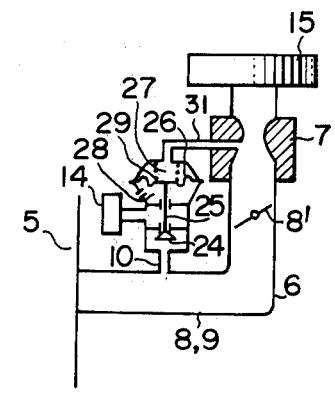
FIG. 5 is a schematic, partial, cross-sectional view of a third internal combustion engine of this invention.

Referring now to FIG. 5, the third embodiment of this invention will be described. Instead of the pipe 30 as used in the above-described second embodiment, this third embodiment has a pipe 31 whose one end communicates with the chamber 27 and the other end with the venturi section of the carburetor 7. Further, the valve disk 24 is so designed as to close the air-supply pipe 10 when venturi vacuum exceeds a given value, and opens it when venturi vacuum becomes lower than the given value. If this critical vacuum is suitably selected, air supply through the air-supply pipe 10 is terminated in the high load area above the isobaric venturi vacuum line shown by a broken curve D in FIG. 3 and air is permitted to flow in the partial or low load area below the broken curve D. Accordingly, this third embodiment also achieves the same effect as the preceding two embodiments.

In the above-described embodiments, a check valve or pressure operating means that operates in accordance with intake manifold or venturi vacuum is employed as means for controlling the amount of air supplied through the air-supply pipe 10. But, of course, it is also possible to control the air flow by detecting changes in pressure of exhaust emissions, hydraulic pressure discharged from a lubricant pump provided in the engine, or discharge pressure of a small-capacity air pump if such a pump is used.

Figure 6:
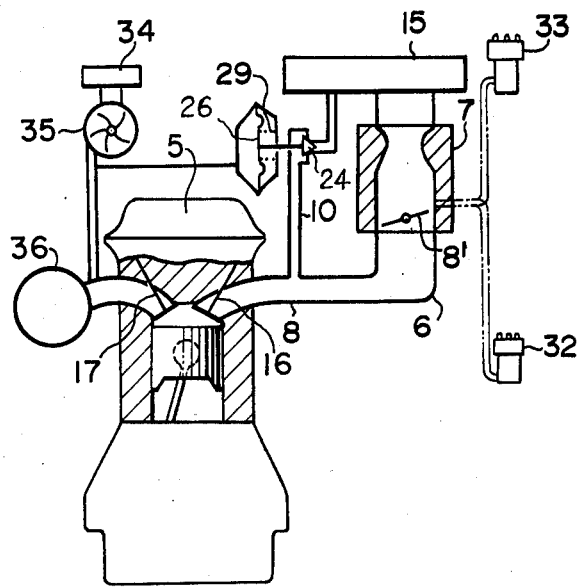
FIGS. 6, 7 and 8 are schematic, partial, cross-sectional views of further embodiments of internal combustion engines according to this invention.

FIG. 6 shows a system utilizing air pressure discharged from an air pump 35 in the engine and reference numerals 32 and 33 designate ignition timing means, reference numeral 34 designates an air cleaner, reference numeral 35 designates an air pump and reference numeral 36 designates a thermal reactor. The air pressure from the air pump 35 works against the force of the spring 29 via a diaphragm 26 for controlling movement of the valve disk 24. For example, in the case that the pressure of spring 29 is set at 200mmHg, if the air pressure produced from the air pump 35 becomes high-load, above 200mmHg, the supply of air from the air cleaner 15 to the No. 2 cylinder 2 and No. 3 cylinder 3 is stopped and the lean-rich system is released.

Figure 7:
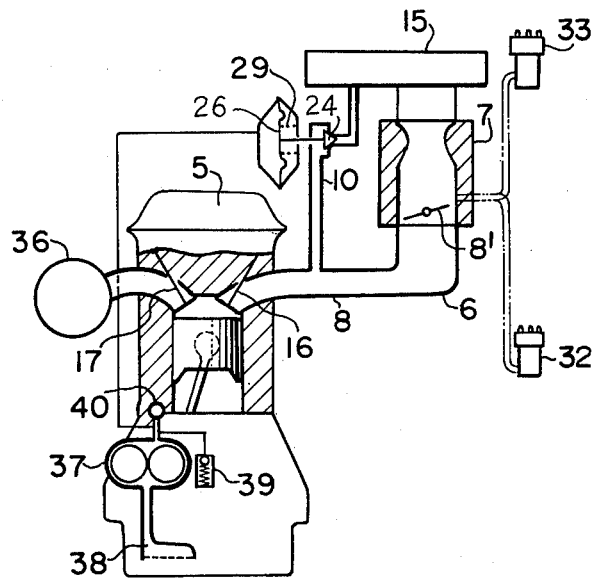

FIG. 7 shows a system utilizing hydraulic pressure discharged from a lubricant pump in the engine instead of air pressure, as compared with the system shown in FIG. 6. In FIG. 7, reference numeral 37 designates a gear-type oil pump, reference numeral 38 designates an oil strainer, reference numeral 39 designates a relief valve and reference numeral 40 designates a gallery.

For example, in the case that the pressure of the spring 29 is set at 5Kg/cm², if the hydraulic pressure becomes high-load, above 5Kg/cm², the supply of air to the No. 2 cylinder and No. 3 cylinder 3 is stopped and the lean-rich system is released.

Figure 8:
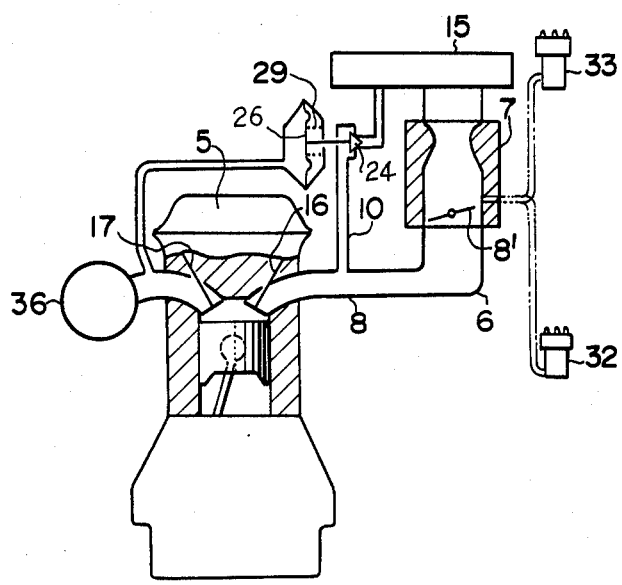

FIG. 8 shows a system utilizing the pressure of exhaust emissions instead of the air pressure or hydraulic pressure, as compared with systems shown in FIGS. 6,7.

For example, in the case that the pressure of spring 29 is set at 100mmHg, if the pressure of the discharged products of combustion or exhaust emissions becomes high-load, above 100mmHg, the supply of air to the No. 2 cylinder 2 and No. 3 cylinder 3 is stopped and the lean-rich system is released.

Figure 9:
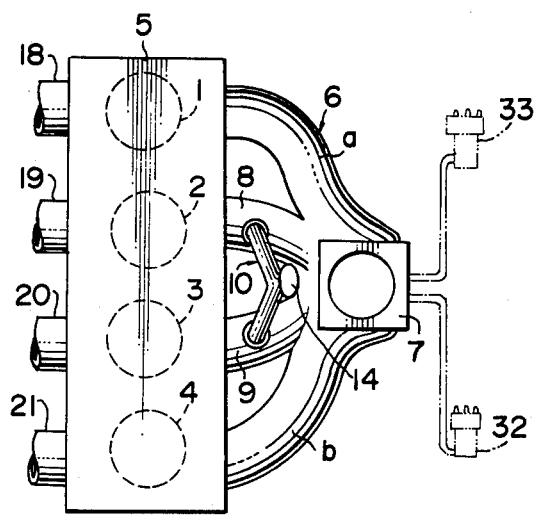
FIG. 9 is a plan view of another variant.

FIG. 9 shows an engine of the type shown in FIGS. 1–2 equipped with ignition timing means 32 and 33 of the type diagrammatically shown in FIG. 6. Such timing means 32 and 33 may comprise a conventional distributor having a vacuum ignition advance mechanism so that the ignition times can be selectively adjusted. The ignition timing means 32 and 33 are composed so as to ignite the rich mixture burning cylinder before igniting the lean-mixture burning cylinder.

According to this invention, it is advantageous that the components of the noxious gases, especially NOx, CO and HC, generated in a conventional engine can be reduced effectively by utilizing the inherent characteristics of the engine without use of an expensive catalytic or purifying device, thereby reducing the cost of the purifying system and making it compact.

What is claimed is:

1. A multicylinder internal combustion engine comprising: a plurality of cylinders; means for making an air-fuel rich mixture to be supplied to said cylinders; first passages for supplying the rich mixture made by said making means to some of said cylinders; second passages for supplying the rich mixture to the remaining ones of said cylinders; an air-supply passage having one end opening in said second passages and the other end communicating with the atmosphere; and valve means disposed in said air-supply passage operative to close the passage under high load conditions so that the rich mixture is supplied to all the cylinders under high load conditions, and, under other operating conditions, the rich mixture is supplied only to the cylinders communicating with the first passages while a lean mixture comprised of air introduced through the air-supply passage mixed with the rich mixture is supplied to the other cylinders comunicating with the second passages.

2. A multicylinder internal combustion engine as claimed in claim 1, wherein the means for making the air-fuel mixture is a carburetor.

3. A multicylinder internal combustion engine as claimed in claim 2, wherein said valve means comprises a pressure responsive member movable in accordance with carburetor venturi vacuum and a valve connected to said member for movement therewith so as to open and close the air-supply passage.

4. A multicylinder internal combustion engine as claimed in claim 3, including means biasing said pressure responsive member to move said valve to close when the venturi vacuum is higher than a given value corresponding generally to high-load conditions.

5. A multicylinder internal combustion engine as claimed in claim 1, wherein air-fuel ratio of the rich mixture supplied to the cylinders communicating with the first passages is approximately 12 to 13 : 1, and that of the lean mixture fed to the cylinders communicating with the second passages is approximately 18 to 20 : 1.

6. A multicylinder internal combustion engine as claimed in claim 1, wherein said valve means comprises a spring-urged check valve.

7. A multicylinder internal combustion engine as claimed in claim 6, including means biasing said check valve to close when the intake manifold vacuum is lower than approximately 150 mmHg corresponding approximately to atmospheric or high-load conditions.

8. A multicylinder internal combustion engine as claimed in claim 1, wherein said valve means comprises a pressure responsive member movable in accordance with the vacuum in either of the passages and a valve connected to said member for movement therewith so as to open and close the air-supply passage.

9. A multicylinder internal combustion engine as claimed in claim 8, including means biasing said pressure responsive member to move said valve to close when the intake manifold vacuum is lower than approximately 150 mmHg corresponding approximately atmospheric or high-load condition.

10. A multicylinder internal combustion engine as claimed in claim 1, further including means for decontaminating exhaust emissions from all the cylinders by oxidizing HC and CO contained therein.

11. A multicylinder internal combustion engine as claimed in claim 1, further including timing means for selectively adjusting the ignition timing of the rich-mixture and lean-mixture burning cylinders respectively so that production of NOx in each of the cylinders is reduced.

12. A multicylinder internal combustion engine as claimed in claim 1, further including an air pump; and wherein said valve means comprises a pressure responsive member connected to the output side of said air pump and movable in accordance with the pressure of air produced by said air pump, and a valve connected to said member for movement therewith so as to open and close said air-supply passage.

13. A multicylinder internal combustion engine as claimed in claim 1, further including a lubricant pump for pumping engine lubricant; and wherein said valve means comprises a pressure responsive member connected to the output side of said lubricant pump and movable in accordance with the pressure of lubricant produced by said lubricant pump, and a valve connected to said member for movement therewith so as to open and close said air-supply passage.

14. A multicylinder internal combustion engine as claimed in claim 1, further including an exhaust manifold for receiving discharged products of combustion discharged from said cylinders; and wherein said valve means comprises a pressure responsive member connected to said exhaust manifold and movable in accordance with the pressure of the discharged products of combustion, and a valve connected to said member for movement therewith so as to open and close said air-supply passage.

* * * * *